United States Patent
Lai et al.

(10) Patent No.: US 11,659,608 B2
(45) Date of Patent: May 23, 2023

(54) METHOD FOR BLUETOOTH ENQUIRY/PAGING AND COMMUNICATION DEVICE THEREFOR

(71) Applicant: MediaTek Singapore Pte. Ltd., Singapore (SG)

(72) Inventors: Wei-Chu Lai, Hsinchu (TW); Wei Liu, Chengdu (CN); Yuan Liu, Chengdu (CN); Yuting Chi, Chengdu (CN); Guangxiong Zhang, Chengdu (CN); Xiao Wen, Chengdu (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 85 days.

(21) Appl. No.: 16/950,997

(22) Filed: Nov. 18, 2020

(65) Prior Publication Data
US 2021/0153272 A1    May 20, 2021

(30) Foreign Application Priority Data
Nov. 20, 2019    (CN) .......................... 201911142202.9

(51) Int. Cl.
*H04W 76/14*    (2018.01)
*H04W 4/70*    (2018.01)
(Continued)

(52) U.S. Cl.
CPC ............ *H04W 76/14* (2018.02); *H04W 4/70* (2018.02); *H04W 4/80* (2018.02); *H04W 68/005* (2013.01)

(58) Field of Classification Search
CPC ....... H04W 4/80; H04W 8/005; H04W 84/18; H04W 4/023; H04W 84/12; H04W 4/21; H04W 48/16; H04W 64/00; H04W 76/10; H04W 4/025; H04W 48/14; H04W 68/005; H04W 76/15; H04W 12/63; H04W 52/0229
See application file for complete search history.

(56) References Cited

U.S. PATENT DOCUMENTS 6,993,049 B2    1/2006 Davies
7,184,458 B2    2/2007 Schmidl et al.
(Continued)

FOREIGN PATENT DOCUMENTS

CN    108632791 A    10/2018

OTHER PUBLICATIONS

Chinese language office action dated Nov. 30, 2020, issued in application No. TW 109124550.

*Primary Examiner* — Kwasi Karikari
(74) *Attorney, Agent, or Firm* — McClure, Qualey & Rodack, LLP (57) ABSTRACT

A method for Bluetooth inquiry/paging and a communication device therefor are provided. The method includes transmitting a plurality of inquiry/paging messages in a transmission time slot to inquire/page a peer device, wherein the number of inquiry/paging messages is greater than two; and activating a plurality reception windows in a reception time slot to receive response messages from the peer device. The invention also provides a corresponding communication device. The invention reduces the time required for inquiry/paging to the peer device, thereby reducing the time it takes to establish a Bluetooth connection between the two devices.

12 Claims, 5 Drawing Sheets

(51) Int. Cl.
*H04W 4/80* (2018.01)
*H04W 68/00* (2009.01)

(56) References Cited

U.S. PATENT DOCUMENTS

| | | |
|---|---|---|
| 7,715,794 B2 | 5/2010 | Hulvey |
| 8,145,264 B1 | 3/2012 | Hirsch et al. |
| 8,879,993 B2 | 11/2014 | Palin |
| 9,001,749 B2 | 4/2015 | Chen et al. |
| 2006/0128308 A1 | 6/2006 | Michael et al. |
| 2010/0062711 A1* | 3/2010 | Park ............... H04W 8/005 455/41.2 |
| 2010/0120364 A1* | 5/2010 | Lee ............... H04W 8/005 455/41.2 |
| 2019/0159214 A1 | 5/2019 | Sun |

* cited by examiner

METHOD FOR BLUETOOTH ENQUIRY/PAGING AND COMMUNICATION DEVICE THEREFOR

CROSS REFERENCE TO RELATED APPLICATIONS

This Application claims priority of CN Patent Application No. 201911142202.9, filed on Nov. 20, 2019, the entirety of which is incorporated by reference herein.

BACKGROUND OF THE INVENTION

Field of the Invention

This invention is related to a field of a communication technology, and, more specifically, to a method for Bluetooth inquiry/paging and a communication device therefor.

Description of the Related Art

For end users, the duration of Bluetooth inquiry/paging is an important factor for customer experience, so the end users generally require a success rate of paging for a certain scenario and further require that an average time of inquiry/paging to a specific device cannot be higher than a certain threshold. The current common practice is to increase the proportion of time occupied by the inquiry/paging to meet the requirements of the end user. However, in a multitasking scenario, if the proportion of time occupied by the inquiry/paging is increased, the time allocated to other tasks (such as ACL link, etc.) will be reduced thereby affecting the other tasks disadvantageously.

BRIEF SUMMARY OF THE INVENTION

According to embodiments of the present invention, the present invention provides a method and communication device for Bluetooth inquiry/paging to solve the above-mentioned problems.

According to the first aspect of the present invention, an exemplary embodiment of a method for Bluetooth inquiry/paging is disclosed and comprises: transmitting a plurality of inquiry/paging messages in a transmission time slot to inquire/page a peer device, wherein the number of inquiry/paging messages is greater than two; and activating a plurality reception windows in a reception time slot to receive response messages from the peer device.

In an embodiment, for two adjacent inquiry/paging messages among the plurality of inquiry/paging messages, the channel corresponding to one of the two adjacent inquiry/paging messages belongs to a first channel train, and the channel corresponding to the other one of the two adjacent inquiry/paging messages belongs to a second channel train.

In an embodiment, channels corresponding to both of two adjacent inquiry/paging messages among the plurality of inquiry/paging messages belong to the same channel train.

In an embodiment, the number of inquiry/paging messages is four.

In an embodiment, the plurality of reception windows comprises four reception windows.

In an embodiment, each of the first channel train and the second channel train comprises sixteen channels with different frequencies.

In an embodiment, the method further comprises: successively transmitting the inquiry/paging messages on all the sixteen channels of the first channel train or the second channel train by a predetermined number of times.

In an embodiment, the predetermined number of times is 128 or 256.

In an embodiment, duration of a scanning time for the peer device to perform scanning process is determined by the time taken to transmit the inquiry/paging messages on all the sixteen channels of the first channel train or the second channel train.

According to another aspect of the present invention, an exemplary embodiment of a communication device is disclosed and comprises a processor and a communication circuit. The communication circuit is connected to the processor. The processor is configured to transmit a plurality of inquiry/paging messages in a transmission time slot through the communication circuit to inquire/page a peer device, wherein the number of inquiry/paging messages is greater than two; and activate a plurality of reception windows in a reception time slot to receive a response message from the peer device through the communication circuit.

In the present invention, a plurality of inquiry/paging messages are transmitted in one transmission time slot, where the number of inquiry/paging messages is greater than two. A plurality of reception windows are activated in one reception time slot to receive a responses message. The invention reduces the time required for inquiry/paging to the peer device, thereby reducing the time for establishing a Bluetooth connection between the two devices.

A detailed description is given in the following embodiments with reference to the accompanying drawings.

BRIEF DESCRIPTION OF THE DRAWINGS

The accompanying drawings are included to provide a further understanding of the present invention. The accompanying drawings are incorporated in this specification and constitute a part of this specification. The drawings illustrate embodiments of the present invention, and serve to explain the principle of the present invention with the specification. In the attached drawings.

DETAILED DESCRIPTION OF THE INVENTION

In order to enable those skilled in the art to better understand the technical solutions of the present invention, the technical solutions of the present invention will be described in further detail below in conjunction with the accompanying drawings and specific embodiments.

First, the inquiry/paging procedure related to the present invention in the current Bluetooth standard will be explained.

Figure 1:
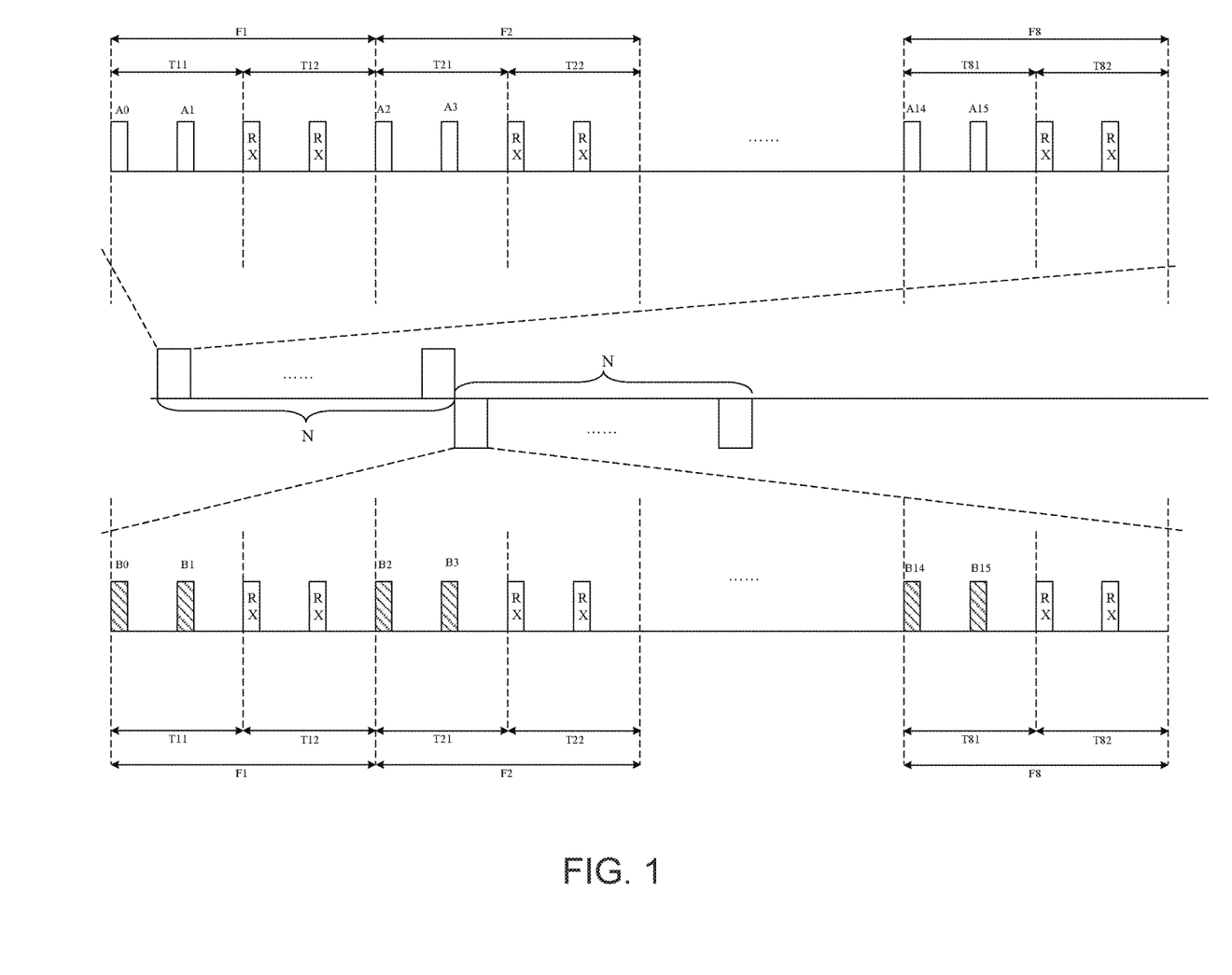
FIG. 1 is a schematic diagram of timing of a master device performing inquiry/paging in a current Bluetooth technology.

During a Bluetooth connection process, an inquiry/paging occupies thirty-two (32) channels, these thirty-two channels are divided into two channel trains, respectively called as an A channel train (A-train) and a B channel train (B-train). Each channel train comprises sixteen (16) channels with different frequencies, that is, the A-train comprises 16 channels (A0, A1, . . . , A15), and the B-train comprises sixteen channels (B0, B1, . . . , B15). A master device first broadcasts inquiry/paging messages on the channels of the A-train. If there is no response from any slave device, the master device then broadcasts inquiry/paging messages on the channels of the B-train. As shown in FIG. 1, the inquiry/paging messages broadcasted on the channels of the A-train are represented by blank squares, and the inquiry/paging messages broadcasted on the channels of the B-train are represented by filled squares.

As shown in FIG. 1, during the inquiry/paging process, first, the master device transmits two inquiry/paging messages in the transmission time slot T11, wherein each inquiry/paging message is transmitted on the corresponding channel. For example, the two inquiry/paging messages are transmitted on the channel A0 and the channel A1 respectively. The slave device starts performing a scanning process at this time. During the scanning process, the slave device scans for the inquiry/paging messages transmitted by the master device on the A-train or B-train. If the slave device detects any inquiry/paging message, it sends a response message.

In the reception time slot T12, the master device respectively activates two reception windows for receiving a response message from the slave device. The time slot T11 and the time slot T12 constitute an inquiry/paging frame F1. If the master device receives a response message in the reception windows, the subsequent connection process is performed between the master device and the slave device. If the master device does not receive any response message from the slave device, the inquiry/paging and scanning procedure between the master device and the slave device is continued.

Subsequently, the master device transmits two inquiry/paging messages in the transmission time slot T21. For example, the master device transmits inquiry/paging messages on the channel A2 and the channel A3 respectively. In the reception time slot T22, two reception windows are activated for receiving a response message from the slave device. The time slot T21 and the time slot T22 constitute an inquiry/paging frame F2.

By analogy, in the transmission time slot T81, the master device transmits inquiry/paging messages on the channel A14 and the channel A15 respectively. In the reception time slot T82, two reception windows are activated for receiving a response message from the slave device. The time slot T81 and the time slot T82 constitute an inquiry/paging frame F8.

In an embodiment, each inquiry/paging message may be an ID packet. The time length of each of the time slot T11, the time slot T12, the time slot T21, the time slot T22, . . . , the time slot T81 and the time slot T82 is 625 us. Each inquiry/paging message occupies 68 us and corresponds to one channel of the A-train. In other words, each inquiry/paging message is transmitted through one channel of the A-train.

In this way, the time required for the master device to transmit completely the inquiry/paging messages corresponding to all sixteen channels of the A-train is equal to 10 ms (=625 us*2*(16/2)).

As shown in FIG. 1, during the inquiry/paging process, the master device successively repeats the transmission of inquiry/paging messages corresponding to all sixteen channels of the A-train N times, that is, the master device successively repeats transmitting the A-train inquiry/paging messages N times, wherein, N is a positive integer and can be set to 128 or 256. At this time, if the master device does not receive any response message, after transmitting the A-train inquiry/paging messages N times, the master device transmits the inquiry/paging messages corresponding to all sixteen channels of the B-train, that is, the master device successively repeats transmitting the B-train inquiry/paging messages N times.

As shown in FIG. 1, the master device completes the process of transmitting the inquiry/paging messages for the B-train, which is the same as the above-mentioned process of the master device transmitting the inquiry/paging messages for the A-train, and the related description will not be repeated here. The difference between the B-train and the A-train is that the frequencies of the sixteen channels of the B-train are different from the frequencies of the sixteen channels of the A-train.

At this time, if the main device still does not receive any response message, the main device will repeat the above operations until it receives a corresponding response message, or the main device gives up the inquiry/paging process.

It can be seen from the above embodiment that the time required for the master device to successively transmit A-train or B-train inquiry/paging messages N times is N*10 ms. Assuming that, during the inquiry/paging process, the master device transmits the inquiry/paging messages on the A-train and the slave device performs the scanning process on the B-train, then the time required for the inquiry/paging to the peer device (slave device) may be up to N*10 ms. Therefore, it takes a long time for the peer device to be discovered by the main device, and the time required for the searching and the connection establishment between the master device and the peer device is relatively long, which will cause bad experience for the users.

Figure 2:
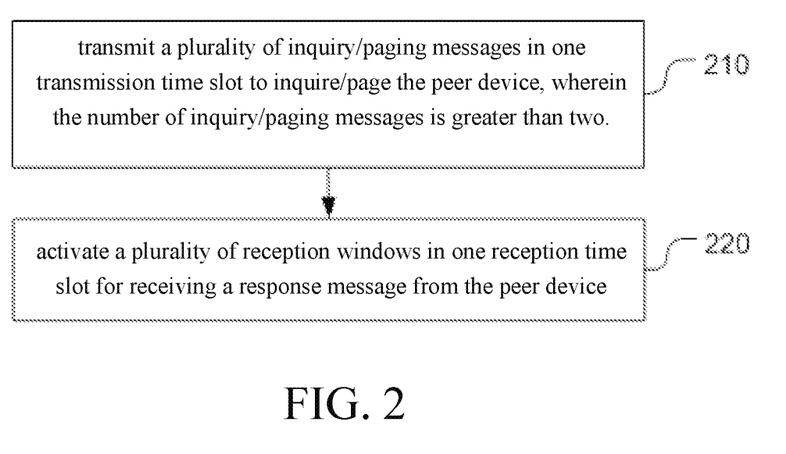
FIG. 2 is a flow chart of a method for Bluetooth inquiry/paging according to an embodiment of the present invention.

According to an embodiment, the present invention provides a method for Bluetooth inquiry/paging. FIG. 2 is a flow chart of a method for Bluetooth inquiry/paging according to an embodiment of the present invention. The method is performed by the master device which can be connected via Bluetooth. The main device can be a Bluetooth chip or a combination chip (comprising a Bluetooth module and a Wi-Fi module), or a device comprising a Bluetooth chip, or a device comprising a combination chip, such as a smart phone. The method comprises the following steps.

Step 210: transmitting a plurality of inquiry/paging messages in one transmission time slot to inquire/page to the peer device.

In an embodiment, the number n of inquiry/paging messages is greater than two.

As described above, each inquiry/page message is transmitted through one channel, in other words, one inquiry/page message is transmitted on one channel. In an embodiment, the number of the plurality of inquiry/paging messages may be four. In this case, four inquiry/paging messages are transmitted in one transmission time slot.

Step 220: activating a plurality of reception windows in one reception time slot for receiving a response message from the peer device.

In one embodiment, the plurality of reception windows may comprise four reception windows. In this case, the main device activates four reception windows for receiving a response message.

As described above, the transmission time slot and the reception time slot constitute an inquiry/paging frame. In some embodiments, the time length of the transmission time slot (for example, 625 us) is equal to the time length of the reception time slot.

By transmitting a plurality of inquiry/paging messages in one transmission time slot (wherein, the number of inquiry/paging messages is greater than two) and activating a plurality of reception windows in one reception time slot for receiving a response message, the time required for the inquiry/paging to the peer device can be reduced, thereby reducing the time for establishing a Bluetooth connection between the two devices.

In one embodiment, two adjacent inquiry/paging messages among the plurality of inquiry/paging messages in one transmission time slot corresponds to different channel trains. For example, the channel corresponding to one of the two adjacent inquiry/paging messages belongs to the first channel train A-train, and the channel corresponding to the other of the two adjacent inquiry/paging messages belongs to the second channel train B-train.

The following describes in detail with reference to the accompanying drawings, taking the master device transmitting four inquiry/paging messages in one transmission time slot as an example, but the present invention is not limited to this.

Figure 3:
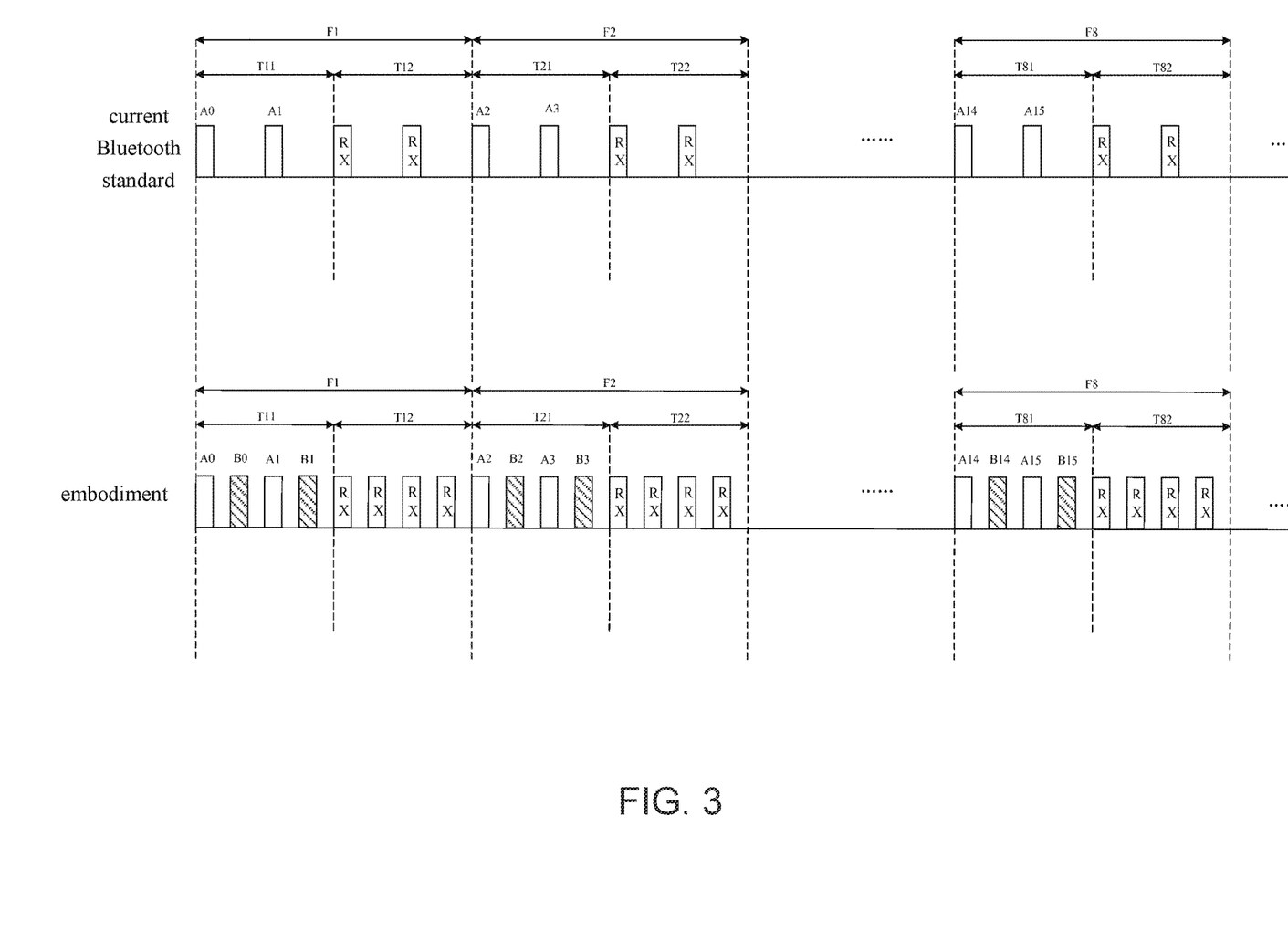
FIG. 3 is a schematic diagram of timing of a master device sending inquiry/paging messages according to a first embodiment of the present invention.

FIG. 3 shows a schematic diagram of timing of an inquiry/paging process between a main device and a slave device according to a first embodiment of the present invention. In the embodiment, the channel corresponding to one of two adjacent inquiry/paging messages among the four inquiry/paging messages belongs to the A-train, and the channel corresponding to the other one of two adjacent inquiry/paging messages belongs to the B-train.

In this embodiment, during the inquiry/paging process, the master device sends four inquiry/paging messages in the transmission time slot T11. Each inquiry/paging message is transmitted through a corresponding channel. For example, according to the order of the channel A0, the channel B0, the channel A1, and the channel B1, the inquiry/paging messages are sent successively. In the reception time slot T12, four reception windows are activated for receiving a response message from the slave device. The time slot T11 and the time slot T12 constitute an inquiry/paging frame F1.

Similarly, in frames F2~F8, as shown in FIG. 3, in each transmission time slot, four inquiry/paging messages are transmitted alternately on the A-train channels and the B-train channels, and, in each reception time slot, four reception windows are activated for receiving a response message from the slave device.

Referring to the time chart of the inquiry/paging process in the current Bluetooth standard shown in the upper part of FIG. 3, in the transmission time slot T11, the master device transmits two inquiry/paging messages on the two channels A0 and A1 of the A-train. Different from the inquiry/paging process in the current Bluetooth standard, in the embodiment, in the transmission time slot T11, the master device alternately transmits four inquiry/paging messages on the channels of the A-train and the B-train, for example, the master device transmits inquiry/page messages on the channels A0, B0, A1, and B1, respectively. In other words, on the basis of the original two inquiry/paging messages in a transmission time slot, two additional inquiry/paging messages are inserted. The two inserted inquiry/paging messages and the original two inquiry/paging messages correspond to different channel trains. Thus, four inquiry/paging messages will be transmitted in the transmission time slot T11 of 625 us.

As mentioned above, in the inquiry/paging process of current Bluetooth standard, the time required for the master device to complete the inquiry/paging messages corresponding to all sixteen channels of the A-train is 10 ms (=625 us*2*(16/2)). However, in the embodiment, since two new inquiry/paging messages, which belong to a channel train different from the channel train of the original inquiry/paging messages, are inserted in one transmission time slot, the master device will not only complete the transmission of the inquiry/paging messages corresponding to all sixteen channels of the A-train but also the transmission of the inquiry/paging messages corresponding to all sixteen channels of the B-train.

In this way, when the slave device performs a scanning process, no matter whether the slave device performs the scanning process on the A-train or the B-train, it can detect the inquiry/paging message transmitted by the master device in one scanning cycle.

During the inquiry/paging process in the current Bluetooth standard, if the channel train on which the master device transmits the inquiry/paging messages is different from the channel train on which the slave device performs the scanning process, the time required for the inquiry/paging to the peer device might be up to N*10 ms (N can be 128 or 256). Compared with the time (=N*10 ms) required in the current Bluetooth standard, in the embodiment, the peer device can be inquired/paged within 10 ms, which significantly reduces the time required to establish connection between the master device and the slave device through Bluetooth, improve experience for the users.

Moreover, in the embodiment, only the part of the inquiry/paging process performed on the master device is modified, and the part thereof performed on the peer device (slave device) is not modified. The slave device still operates in accordance with the Bluetooth standard, in which the slave device scans for the inquiry/paging messages and sends a response message to the main device after detecting any inquiry/paging message. In this way, the application range of the inquiry/paging method proposed in the embodiment of the present invention can be greatly increased, and the improved master device can be paired with any existing Bluetooth device.

In another embodiment, the channels corresponding to two adjacent inquiry/paging messages among the plurality of inquiry/paging messages in a transmission time slot belong to the same channel train. For example, they all belong to the first channel train A-train or the second channel train B-train.

The following describes in detail with reference to the accompanying drawings, taking the master device transmitting four inquiry/paging messages in one transmission time slot as another example, but the present invention is not limited to this.

Figure 4:
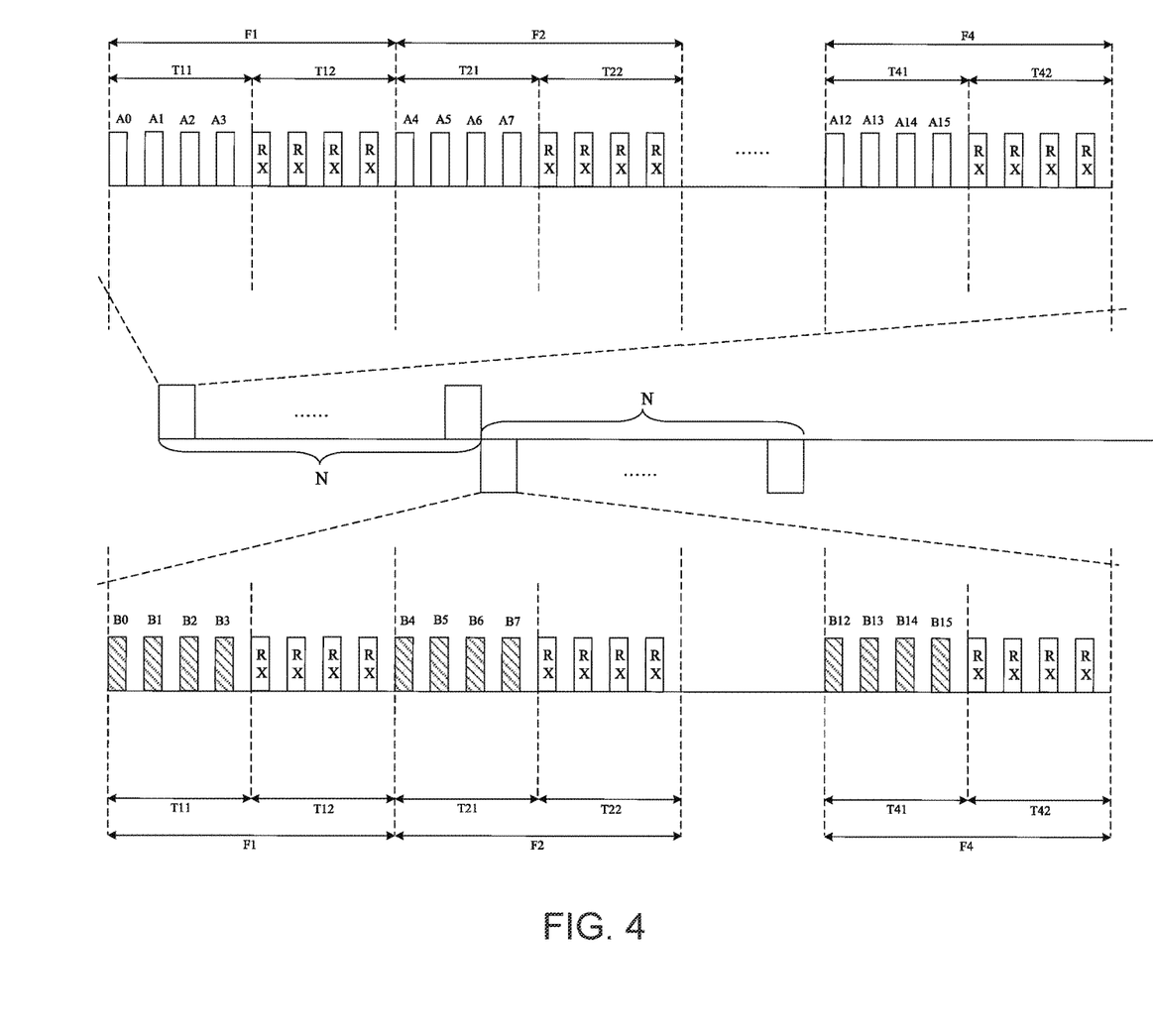
FIG. 4 is a schematic diagram of timing of a master device sending inquiry/paging messages according to a second embodiment of the present invention.

FIG. 4 shows a schematic diagram of timing of an inquiry/paging process between a main device and a slave device according to a second embodiment of the present invention. In the embodiment, the channels corresponding to the four inquiry/paging messages all belong to the same channel train, e.g., the A-train or B-train.

During the inquiry/paging process, the master device transmits four inquiry/paging messages in the transmission time slot T11. Each inquiry/paging message is transmitted through a corresponding channel. For example, according to the order of the channel A0, the channel A1, the channel A2, and the channel A3, the inquiry/paging messages are transmitted successively. That is, the inquiry/paging messages are transmitted on four respective channels of the A-train. In the reception time slot T12, four reception windows are activated for receiving a response message from the slave device. The time slot T11 and the time slot T12 constitute an inquiry/paging frame F1.

Similarly, in the frames F2~F4, as shown in FIG. 4, in each transmission time slot, four inquiry/paging messages are transmitted on the channels of the A-train, and, in the reception time slot, four reception windows are activated for receiving a response message from the slave device.

Referring to the time chart of the inquiry/paging process in the current Bluetooth standard, in the transmission time slot T11, the master device transmits two inquiry/paging messages on the two channels A0 and A1 of the A-train. In the embodiment, the master device transmits four inquiry/paging messages on the channels A0, A1, A2, and A3 of the A-train in the transmission time slot T11. In other words, on the basis of the original two inquiry/paging messages in a transmission time slot, two additional inquiry/paging messages are inserted. The inserted two inquiry/paging messages and the original two inquiry/paging messages correspond to the same channel train. Thus, four inquiry/paging messages will be transmitted in the transmission time slot T11 of 625 us.

It should be noted that in the embodiment, since the inquiry/paging messages are transmitted on four different channels of the same channel train in each transmission time slot, the inquiry/paging messages corresponding to all sixteen channels of the A-train can be completed with only four transmission time slots, that is, the inquiry/paging messages of the A-train are completed in the inquiry/paging frame F4. Therefore, the time required for the master device to complete the inquiry/paging messages corresponding to the sixteen channels of the A-train is 5 ms (=625 us*2*(16/4)).

In the current Bluetooth standard, since only two inquiry/paging messages are transmitted in each transmission time slot, the inquiry/paging messages corresponding to the sixteen channels of the A-train are completed in the inquiry/paging frame F8, which takes 10 ms. Therefore, compared with the inquiry/paging process of the current Bluetooth standard, the time required for the master device in this embodiment to complete the inquiry/paging messages corresponding to all sixteen channels of the A-train is decreased in half.

During the inquiry/paging process, the master device successively repeats the above operation N times to transmit the inquiry/paging messages corresponding to the sixteen channels of the A-train N times, that is, the master device successively transmits the inquiry/paging messages for the A-train N times, wherein, N is a positive integer and can be set to 128 or 256. At this time, if the master device does not receive any response message, after transmitting the inquiry/paging message for A-train N times, the master device transmits the inquiry/paging message corresponding to the sixteen channels of the B-train N times, that is, the master device successively transmits the inquiry/paging messages for the B-train N times.

As shown in FIG. 4, the process of the master device completing the transmission of the inquiry/paging messages for the B-train is the same as the process of completing the transmission of the inquiry/paging messages for the A-train by the master device. Thus, the related description is omitted here. The difference between these processes is that frequencies of the sixteen channels of the B-train are different from the frequencies of the sixteen channels of the A-train.

At this time, if the main device still does not receive any response message, the main device will repeat the above operations until it receives a corresponding response message, or the main device gives up the inquiry/paging process.

It can be seen from the above embodiment that the time required for the master device to complete the inquiry/paging messages corresponding to the sixteen channels of the A-train is half the current Bluetooth standard. Therefore, the time required for the slave device to be discovered by the mast device is reduced by about half, reducing the time required for the master device and slave device to establish a connection in Bluetooth and improving the user experience.

In addition, the duration of the scanning time for the peer device (slave device) to perform the scanning process is determined by the time taken by the master device to transmit the inquiry/paging messages on all sixteen channels of the first channel train or the second channel train. Therefore, since the time required for the master device to complete inquiry/paging messages corresponding to the sixteen channels of the A-train is decreased by half, the scanning time required for the peer device to perform the scanning process will also be decreased by half, which can decrease the power consumption of the peer device during the scanning process. Generally, the slave devices in Bluetooth are mostly small and power consumption-sensitive devices, such as Bluetooth headsets, Bluetooth mice, and wearable devices. Therefore, the reduction of the power consumption of the slave devices is of great significance in practical applications.

It should be noted, as known to those skilled in the art, the "master" device or the "slave" device does not intend to limit the device itself. During the Bluetooth connection, the device itself can become a master device or a slave device according to whether it is the initiator or responder of the connection.

Figure 5:
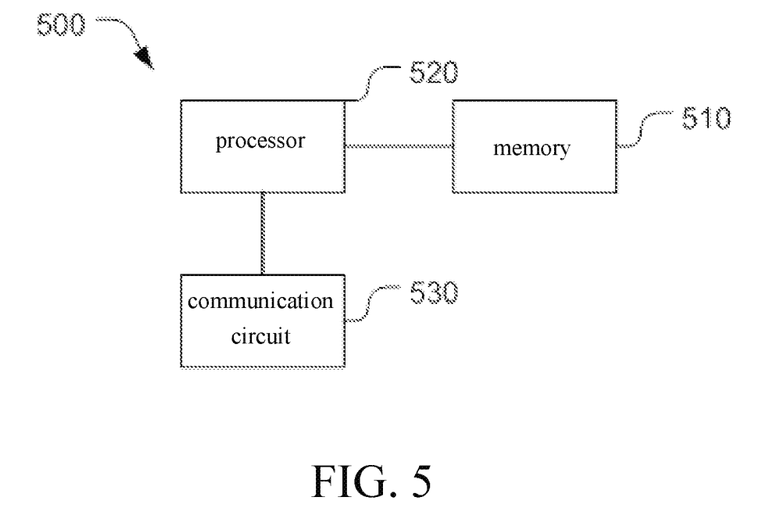
FIG. 5 is a schematic structural diagram showing a communication device according to an embodiment of the present invention.

FIG. 5 is a schematic structural diagram showing a communication device according to an embodiment of the present invention. A communication device 500 may operate as a master device in a Bluetooth connection and comprise a memory 510, a processor 520, and a communication circuit 530. The memory 510 and the communication circuit 530 are connected to the processor 520 respectively.

The memory 510 may comprise a read-only memory and/or a random access memory, etc., and provides instructions and data to the processor 520. A part of the memory 510 may also comprise non-volatile random access memory (NVRAM). The memory 510 stores instructions. When the instructions are executed, the method for Bluetooth inquiry/paging and the inquiry/paging process provided by any one or any non-conflicting combination of the foregoing embodiments of the present invention may be implemented.

The communication circuit 530 operates to transmit and receive data and serves as an interface for the communication device 500 to communicate with other devices.

The processor 520 is configured to perform the method for Bluetooth inquiry/paging and/or the Bluetooth inquiry/paging process in the foregoing embodiment of the present invention.

The processor 520 may be an integrated circuit chip with signal processing capabilities. During the implementation process, the steps of the foregoing method can be completed by hardware integrated logic circuits in the processor 520 or instructions in the form of software. The aforementioned processor 520 may be a general-purpose processor, a digital signal processor (DSP), a dedicated integrated circuit (ASIC), a field programmable gate array (FPGA) or other programmable logic device, a discrete gate or transistor logic device, a discrete hardware device. The general-purpose processor may be a microprocessor, or the processor 51 may also be any conventional processor. The methods, steps, and logical block diagrams disclosed in the embodiments of the present invention can be implemented or executed.

The foregoing is only the implementation of the application, and does not limit the scope of the patent application of the application. Any equivalent structure or equivalent process transformation made by using the content of the specification and drawings of the application, or directly or indirectly applied to other related the technical fields of are included in the scope of patent protection of this application.

What is claimed is:

1. A method for Bluetooth inquiry/paging process, comprising:
    transmitting a plurality of inquiry/paging messages in a transmission time slot of an inquiry/paging frame to inquire/page a peer device, wherein the number of inquiry/paging messages is greater than two; and
    activating a plurality of reception windows in a reception time slot of the inquiry/paging frame to receive a response message from the peer device,
    wherein for two adjacent inquiry/paging messages among the plurality of inquiry/paging messages, a channel corresponding to one of the two adjacent inquiry/paging messages belongs to a first channel train, and a channel corresponding to the other one of the two adjacent inquiry/paging messages belongs to a second channel train, and each of the first channel train and the second channel train comprises sixteen channels with different frequencies.

2. The method for Bluetooth inquiry/paging as claimed in claim 1, wherein channels corresponding to both of two adjacent inquiry/paging messages among the plurality of inquiry/paging messages belong to the same channel train.

3. The method for Bluetooth inquiry/paging as claimed in claim 1, wherein the number of inquiry/paging messages is four.

4. The method for Bluetooth inquiry/paging as claimed in claim 1, wherein plurality of reception windows comprises four reception windows.

5. The method for Bluetooth inquiry/paging as claimed in claim 1, further comprising:
    successively transmitting the inquiry/paging messages on all the sixteen channels of the first channel train or the second channel train a predetermined number of times.

6. The method for Bluetooth inquiry/paging as claimed in claim 1, wherein duration of a scanning time for the peer device to perform scanning process is determined by the time taken to transmit the inquiry/paging messages on all the sixteen channels of the first channel train or the second channel train.

7. A communication device, comprising:
    a communication circuit which, during operation, wirelessly communicates with a peer device; and
    a processor coupled to the communication circuit, such that, during operation, the processor performs operations comprising:
    transmitting a plurality of inquiry/paging messages in a transmission time slot of an inquiry/paging frame through the communication circuit to inquire/page a peer device, wherein the number of inquiry/paging messages is greater than two; and
    activating a plurality of reception windows in a reception time slot of the inquiry/paging frame to receive a response message from the peer device through the communication circuit,
    wherein for two adjacent inquiry/paging messages among the plurality of inquiry/paging messages, a channel corresponding to one of the two adjacent inquiry/paging messages belongs to a first channel train, and a channel corresponding to the other one of the two adjacent inquiry/paging messages belongs to a second channel train, and each of the first channel train and the second channel train comprises sixteen channels with different frequencies.

8. The communication device as claimed in claim 7, wherein channels corresponding to both of the two adjacent inquiry/paging messages among the plurality of inquiry/paging messages belong to the same channel train.

9. The communication device as claimed in claim 7, wherein the number of inquiry/paging messages is four.

10. The communication device as claimed in claim 7, wherein plurality of reception windows comprises four reception windows.

11. The communication device as claimed in claim 7, wherein the processor is further configured to:
    successively transmit the inquiry/paging messages on all sixteen channels of the first channel train or the second channel train a predetermined number of times.

12. The communication device as claimed in claim 7, wherein duration of a scanning time for the peer device to perform scanning process is determined by the time taken by the communication device to transmit the inquiry/paging messages on all the sixteen channels of the first channel train or the second channel train.

* * * * *